United States Patent [19]

Krivec

[11] 3,994,405
[45] Nov. 30, 1976

[54] CONSTANT CLEARANCE LUGGAGE CONTAINER UNLOADER

[75] Inventor: Bert Krivec, Waukesha, Wis.

[73] Assignee: Rexnord Inc., Milwaukee, Wis.

[22] Filed: Aug. 26, 1975

[21] Appl. No.: 607,965

[52] U.S. Cl. .............................. 214/62 R; 105/268; 214/62 A; 214/307
[51] Int. Cl.² ..................................... B65G 67/24
[58] Field of Search ................. 214/62 A, 62 R, 53, 214/60, 307, 306; 198/155, 143; 105/241 C, 268; 244/114 R, 137 R

[56] References Cited
UNITED STATES PATENTS 3,863,781  2/1975  Butzow et al. ............... 214/62 A Primary Examiner—Robert J. Spar
Assistant Examiner—Robert C. Watson
Attorney, Agent, or Firm—Sughrue, Rothwell, Mion, Zinn & Macpeak

[57] ABSTRACT

In a luggage container unloader of the type disclosed in U.S. Pat. No. 3,863,781, the improvement wherein at least one of the plurality of pivoting doors is mounted on a parallelogram hinge the imaginary axis of which is at least approximately congruent with the axis about which the luggage containers are pivoted, whereby the relative positions of the containers, the conveyors on which the containers are carried through the unloading station, and the pivoting doors remain fixed while the containers are being conveyed through the unloading station.

4 Claims, 11 Drawing Figures

U.S. Patent  Nov. 30, 1976  Sheet 1 of 3  3,994,405
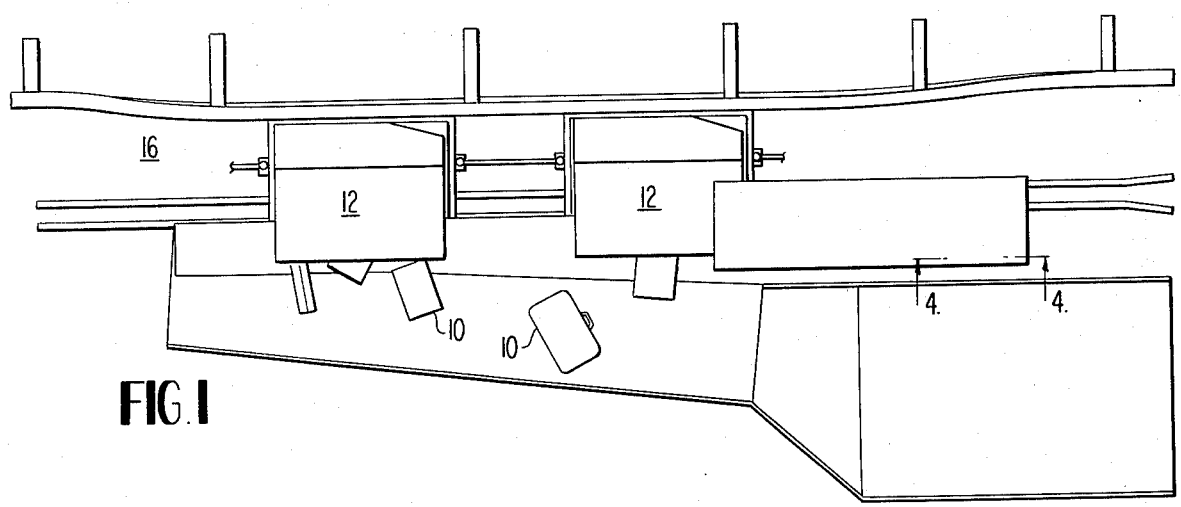
FIG.1
FIG.2a PRIOR ART
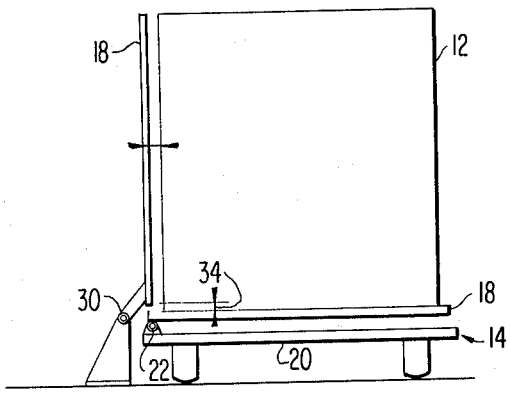
FIG.2b PRIOR ART
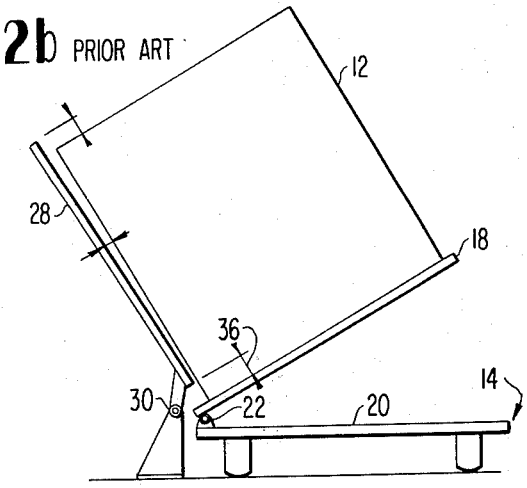
FIG.3a
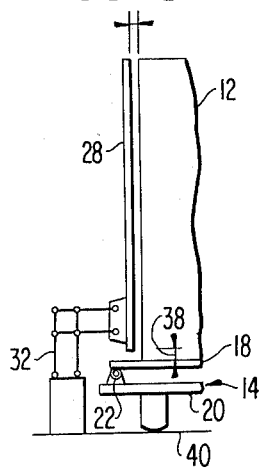
FIG.3b
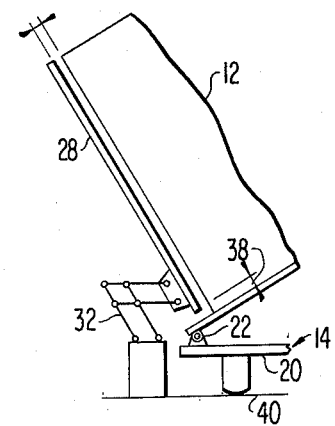
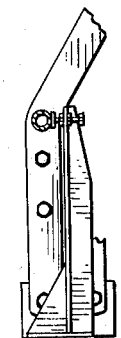
FIG.8

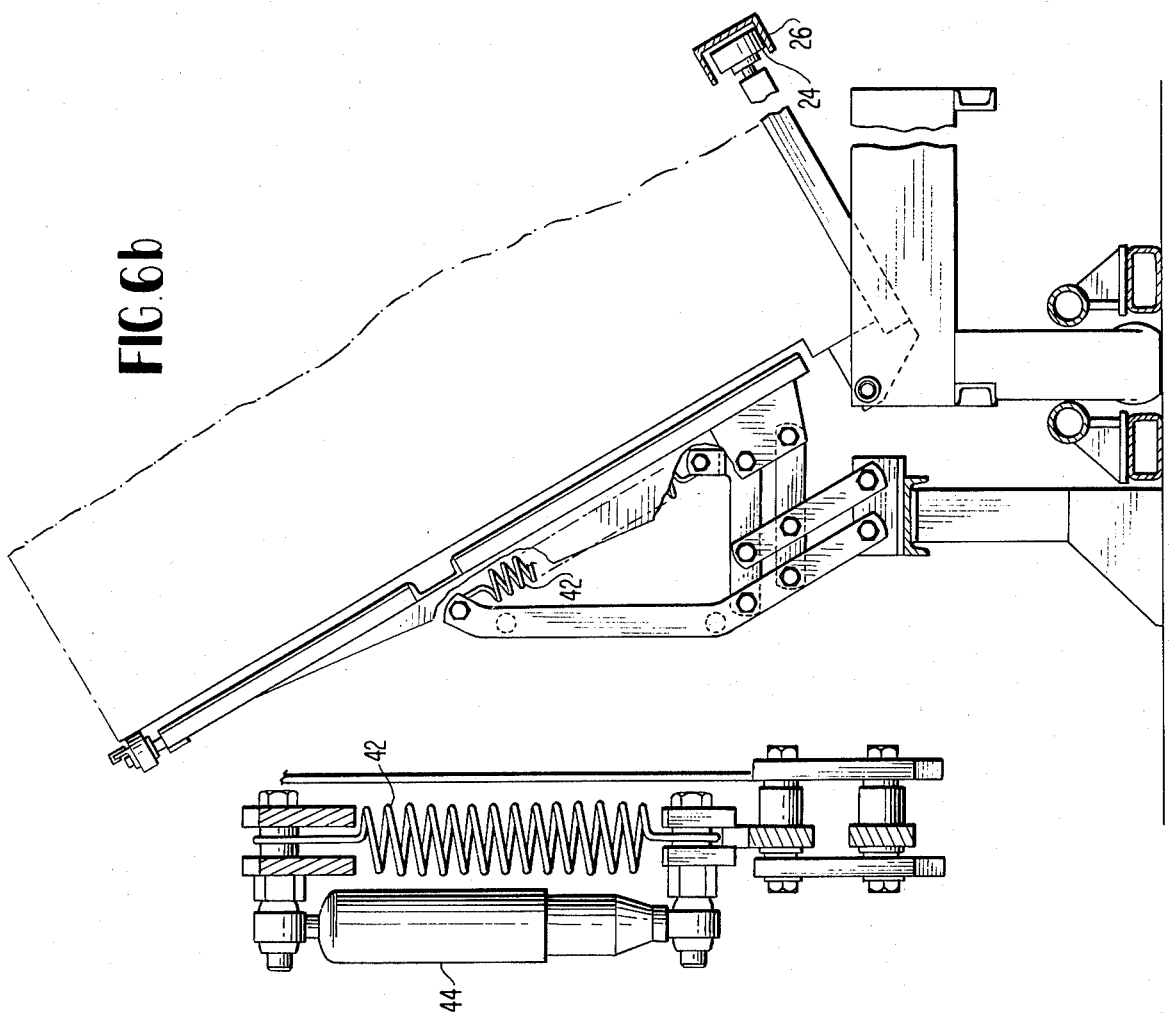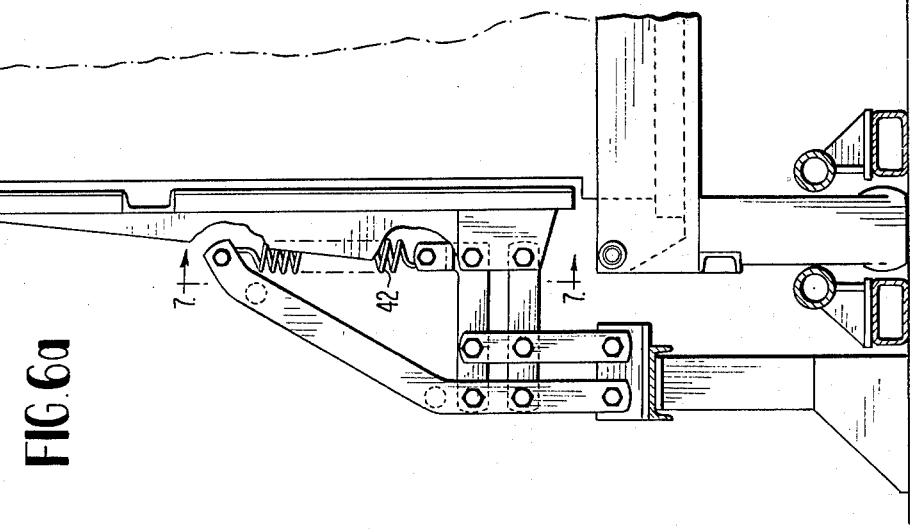

3,994,405

CONSTANT CLEARANCE LUGGAGE CONTAINER UNLOADER

BACKGROUND OF THE INVENTION

1. Field of the Invention

This invention relates generally to apparatus for unloading articles from containers while the containers are being conveyed through an unloading station, and it is particularly well adapted to unloading luggage from airplane flight containers.

2. Description of the Prior Art

This invention is an improvement on the apparatus described in commonly assigned U.S. Pat. No. 3,863,781, issued Feb. 4, 1975, to Butzow et al. The apparatus described therein suffered from the drawback, more particularly described hereinafter with reference to FIGS. 2a and 2b, that the relative positions of the containers, the conveyors on which the containers were carried through the unloading station, and the pivoting doors did not remain fixed while the containers were being conveyed through the unloading stations. That drawback is overcome by the subject invention.

SUMMARY OF THE INVENTION

According to the subject invention, at least one of the plurality of pivoting doors of the luggage retaining surface is mounted on a parallelogram hinge the imaginary axis of which is at least approximately congruent with the axis about which the luggage containers are pivoted, whereby the relative positions of the containers, the conveyors on which the containers are carried through the unloading station, and the pivoting doors remain fixed while the containers are being conveyed through the unloading station.

BRIEF DESCRIPTION OF THE DRAWINGS

FIG. 1 is a plan view of an unloading station employing the present invention.

FIGS. 2a and 2b illustrate in schematic form the manner in which the containers, the conveyors, and the pivoting doors moved relative to each other during tilting of the apparatus described in the above-mentioned patent.

FIGS. 3a and 3b illustrate in schematic form the manner in which the containers, the conveyors, and the pivoting doors remain fixed relative to each other during tilting of the apparatus claimed herein.

FIGS. 6a and 6b are views taken along the line 6—6 in FIG. 4; these views correspond to FIGS. 3a and 3b.

FIG. 7 is a view taken along the line 7—7 in FIG. 6a.

FIG. 8 is a view taken along the line 8—8 in FIG. 4.

DESCRIPTION OF THE PREFERRED EMBODIMENT

Figure 4:
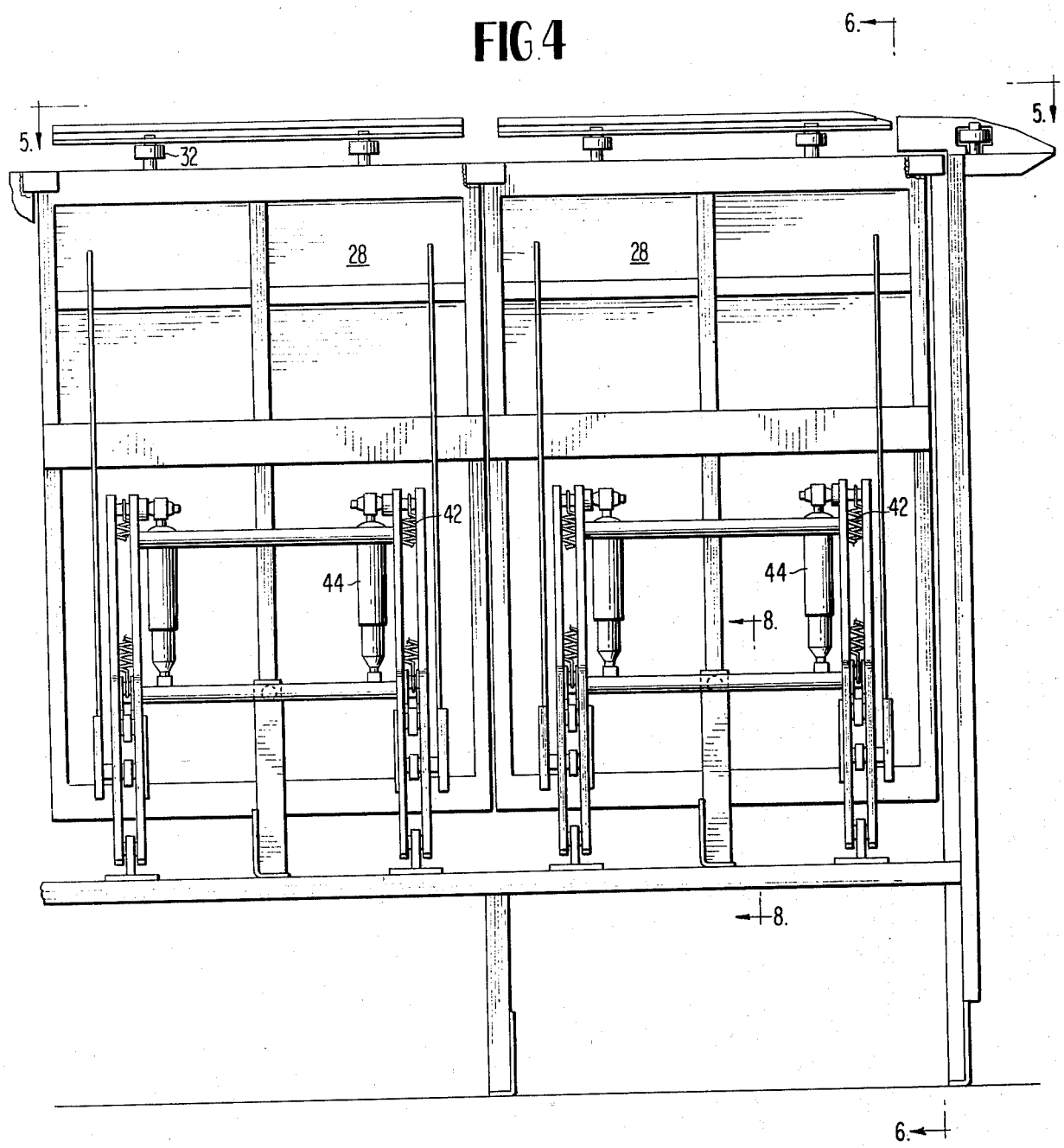
FIG. 4 is a view taken along the line 4—4 in FIG. 1.

FIG. 1 shows an embodiment of the present invention adapted for use in unloading luggage 10 from conventional airplane flight containers 12. The flight containers 12 are light-weight structures, in form something like a bookcase, but with covers on one or both sides which may be folded up to permit loading and unloading and down to protect the contents from inclement weather encountered on the trip between the airplane and the unloading station. The flight containers 12 are adapted to be loaded on airplanes and quickly unloaded on to dollies 14 which may be pulled to and through the unloading station in the direction of the arrow 16 by a tractor (not shown).

The dollies 14 may be basically conventional airport dollies. However, each dolly is outfitted with an upper surface 18 which is pivotably mounted with respect to the body 20 of the dolly 14 by hinges 22 and carries a cam roller 24 (see FIGS. 6a and 6b) mounted on the side opposite from the hinges 22 in position to cooperate with a cam surface 26. The upper surface 18 consititutes a first conveyor which is adapted to carry the container 12 and which is adapted to tilt about a first axis parallel to the direction in which the container 12 is conveyed through the unloading station while it is being conveyed through the unloading station.

Figure 5:
FIG. 5 is a view taken along the line 5—5 in FIG. 4.

On the opposite side of the dolly from the cam surface 26, and starting at least one container length before the cam surface 26 begins to cause the upper surface 18 of the dolly 14 to tilt, are a plurality of retaining doors 28. In the apparatus shown in FIGS. 2a and 2b, the doors 28 were pivotably mounted about a hinge 30 the axis of which was parallel to the direction of motion of the dolly 14 and located at a height approximately equal to that of the hinge 22; in the apparatus shown in FIGS. 3a and 3b, the doors 28 are mounted on parallelogram hinges 32 the imaginary axes of which are at least approximately congruent with the axis of the hinges 22 while the container 12 is being conveyed through the unloading station. In either design, when the containers 12 are tilted against the rollers 32 (see FIGS. 4 and 5) on the retaining doors 28, the doors rotate with the containers. However, in the design illustrated in FIGS. 2a and 2b, the retaining doors 28 both translated and rotated with respect to the containers 12, causing the gap 34 (illustrated in FIG. 2a) between the bottom of the retaining doors 28 and the top of the upper surface 18 of each dolly 14 to open up to the larger gap 36 (illustrated in FIG. 2b). While the gap 36 did not create a major problem, it did permit an occasional very thin piece of luggage or portion of a larger piece of luggage to slide out into the gap. This drawback is overcome in the apparatus illustrated in FIGS. 3a and 3b. Since the containers 12 and the retaining doors 28 both pivot about the axis of the hinges 22, the gap 38 corresponding to the gaps 34 and 36 remains constant in size, and since the size of the gap 38 is limited only by the variations in the distance between the pathway 40 and the upper surfaces 18 of the dolleys 14, the gap 38 can be made very small — far too small for even the thinnest piece of luggage to slide into it.

The presently preferred embodiment of this invention is illustrated in greater detail in FIGS. 4—8. As shown therein, each of the doors 28 is provided with both means for pivoting it back to its initial position when no container is pressing against it and means for damping its motion as it pivots back to its initial position. In the embodiment illustrated, the former means comprises the springs 42, and the latter means comprises the dashpots 44.

CAVEAT

While the present invention has been illustrated by a detailed description of a preferred embodiment thereof, it will be obvious to those skilled in the art that various changes in form and detail can be made therein without departing from the true scope of the invention. For that reason, the invention must be measured by the claims appended hereto and not by the foregoing preferred embodiment.

What is claimed is:

1. In apparatus for unloading articles from a container while the container is being conveyed through an unloading station, said apparatus comprising:
 a. a first conveyor which is
  i. adapted to carry said container and
  ii. adapted to tilt about a first axis parallel to the direction in which said container is to be conveyed through said unloading station while said container is being conveyed through said unloading station;
 b. a retaining surface comprising a plurality of doors
  i. pivotably mounted about a second axis parallel to the direction in which said container is to be conveyed through said unloading station,
  ii. adapted to bear against articles contained in said containers while said first conveyor is being tilted, and
  iii. built in overlapping relationship so that the doors downstream of any given door will always be rotated by at least as much as that door, thereby ensuring a smooth transition from one door to the next as said container is conveyed through the unloading station; and
 c. a second conveyor which is
  i. adapted to carry said articles and
  ii. located in said unloading station immediately downstream of said retaining surface in a position to receive articles slid off said container, the improvement wherein at least one of said plurality of doors is mounted on a parallelogram hinge the imaginary axis of which is at least approximately congruent with said first axis while said container is being conveyed through said unloading station, whereby the relative positions of said container, said first conveyor, and said retaining surface remain fixed while said container is being conveyed through said unloading station.

2. Apparatus as recited in claim 1 wherein each of said plurality of doors is mounted on a parallelogram hinge as recited in claim 1.

3. Apparatus as recited in claim 1 and further comprising means for pivoting each of said plurality of doors back to its initial position after said container has passed it.

4. Apparatus as recited in claim 3 and further comprising means for damping the motion of each of said plurality of doors as it pivots back to its initial position after said container has passed it.

* * * * *